United States Patent
Dotan-Cohen et al.

(10) Patent No.: US 10,257,127 B2
(45) Date of Patent: Apr. 9, 2019

(54) EMAIL PERSONALIZATION

(71) Applicant: Microsoft Technology Licensing, LLC, Redmond, WA (US)

(72) Inventors: Dikla Dotan-Cohen, Herzliya (IL); Ido Priness, Hertzliya (IL); Haim Somech, Ramat Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/232,580

(22) Filed: Aug. 9, 2016

(65) Prior Publication Data

US 2018/0048595 A1    Feb. 15, 2018

(51) Int. Cl.
  *G06F 15/16*    (2006.01)
  *H04L 12/58*    (2006.01)
  (Continued)

(52) U.S. Cl.
  CPC ........... *H04L 51/04* (2013.01); *G06Q 10/107* (2013.01); *G06Q 10/1093* (2013.01);
  (Continued)

(58) Field of Classification Search
  CPC .............. G06Q 10/107; G06Q 10/1093; H04L 12/5825; H04L 12/583; H04L 12/5835;
  (Continued)

(56) References Cited

U.S. PATENT DOCUMENTS 6,424,362 B1   7/2002  Bornstein et al.
7,120,865 B1  10/2006  Horvitz et al.
(Continued)

FOREIGN PATENT DOCUMENTS

EP   2531912 A2   12/2012
WO  2001009755 A2   2/2001
(Continued)

OTHER PUBLICATIONS

Zerfos, et al., "Mobile Computing, Applications, and Services", In Proceedings of First International ICST Conference, Oct. 26, 2009, 2 pages.

(Continued)

*Primary Examiner* — Liang Che A Wang
*Assistant Examiner* — Johnny B Aguiar
(74) *Attorney, Agent, or Firm* — Shook, Hardy & Bacon L.L.P.

(57) ABSTRACT

Incoming mail messages for a user may be ranked, modified, and/or summarized based on a number of factors, including characteristics of the user computing devices used for accessing email and the user's current context. User context may include location, whether the user is currently driving, how much time the user has to read email messages, etc. Features of incoming email messages are analyzed, including length, attachments, sender, etc. User-related activity and characteristics of the user's computing devices are determined and analyzed to determine a user context, for instance, the user's location, mode of movement, time slot available for the user to read email messages, upcoming events on the user's calendar, etc. The email messages are then ranked according to the user context and/or user computing device characteristics. At least a portion of the email messages are provided for presentation via a user computing device based on the ranking.

11 Claims, 7 Drawing Sheets

(51) Int. Cl.
*G06Q 10/10* (2012.01)
*H04L 29/08* (2006.01)

(52) U.S. Cl.
CPC .............. *H04L 51/08* (2013.01); *H04L 51/20*
(2013.01); *H04L 29/08927* (2013.01); *H04L 29/08936* (2013.01); *H04L 51/06* (2013.01); *H04L 51/063* (2013.01); *H04L 51/066* (2013.01); *H04L 51/26* (2013.01); *H04L 67/303* (2013.01); *H04L 67/306* (2013.01)

(58) Field of Classification Search
CPC ..... H04L 51/06; H04L 51/063; H04L 51/066; H04L 51/26; H04L 29/08927; H04L 29/08936; H04L 67/303; H04L 67/306; H04L 29/08675; H04L 67/22; H04L 12/5865; H04L 51/04; H04L 51/08; H04L 51/20
USPC .................................. 709/206, 207, 224, 246
See application file for complete search history.

(56) References Cited

U.S. PATENT DOCUMENTS

| | | | |
|---|---|---|---|
| 7,890,960 B2 | 2/2011 | McKee et al. | |
| 7,941,491 B2 | 5/2011 | Sood | |
| 8,055,713 B2 | 11/2011 | Simske et al. | |
| 2002/0016818 A1* | 2/2002 | Kirani | G06F 17/30902 709/203 |
| 2003/0140088 A1* | 7/2003 | Robinson | G06Q 10/10 709/202 |
| 2003/0233419 A1 | 12/2003 | Beringer | |
| 2005/0060381 A1* | 3/2005 | Huynh | H04L 29/06 709/206 |
| 2005/0108338 A1* | 5/2005 | Simske | G10L 15/26 709/206 |
| 2009/0006565 A1* | 1/2009 | Velusamy | G06F 17/211 709/206 |
| 2010/0082750 A1 | 4/2010 | Kunz et al. | |
| 2010/0223341 A1* | 9/2010 | Manolescu | G06F 17/30867 709/206 |
| 2011/0066687 A1* | 3/2011 | Chen | H04L 12/5835 709/206 |
| 2011/0131221 A1 | 6/2011 | Bhide et al. | |
| 2012/0136939 A1* | 5/2012 | Stern | G06Q 10/107 709/206 |
| 2012/0290289 A1* | 11/2012 | Manera | G06F 17/2785 704/9 |
| 2015/0033141 A1 | 1/2015 | Mishra | |
| 2017/0124038 A1* | 5/2017 | Upadhyay | G06F 17/24 |

FOREIGN PATENT DOCUMENTS

| | | |
|---|---|---|
| WO | 2015017508 A1 | 2/2015 |
| WO | 2015094891 A1 | 6/2015 |
| WO | 2016090193 A1 | 6/2016 |

OTHER PUBLICATIONS

"2016 Best Free Email Service Reviews", Retrieved on: Dec. 29, 2015 Available at: http://free-email-services-review.toptenreviews.com/.

"How should Email Threads be ordered?", Published on: Jun. 22, 2013 Available at: http://ux.stackexchange.com/questions/39670/how-should-email-threads-be-ordered.

Chirita, Paul-Alexandru, "Emerging Applications of Link Analysis for Ranking", In PhD Thesis of University of Hanover, Retrieved on: Dec. 29, 2015, 181 pages.

"International Search Report and Written Opinion Issued in PCT Application No. PCT/US2017/045394", dated Sep. 28, 2017, 16 Pages.

* cited by examiner

EMAIL PERSONALIZATION

BACKGROUND

Electronic mail messages (email messages) have become one of the most popular forms of communication types, especially for those who frequently need to exchange information with others. The number of emails an individual receives in an inbox can be overwhelming to sort through, as many may not be relevant to the individual at all, or at the current time. Even more, the individual may not be able to access a particular email message attachment on the device currently in use. While some email systems attempt to sort through the incoming email messages for a user, this typically does not result in an increased efficiency for the user, as it may take into account only a predicted importance to a user. Furthermore, the different types of devices available to users is on the rise, such as wearable computing-devices and smart glasses, which presents a new issue as to how email content is presented to users on these different types of devices.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present disclosure are directed to technologies for personalizing email by providing email content to users based on user context or user computing-device ("user device") context. The technologies may modify email content for delivery or presentation to a user (such as by ranking, reordering, filtering, summarizing, or otherwise modifying) email content based on an analysis of the email messages, user context, and/or user device capabilities. User context could include, for example, whether the user is on-the-go or at home/work, whether the user is alone or is with other people, the user's location, the user's interests/preferences, mode of movement, time slots available for the user to read/view email messages, upcoming events on the user's calendar, etc. Device characteristics may include, for example, screen availability and size, reading capabilities, input methods available, applications available on the device, available communication bandwidth, data usage, and the like. The modification of email messages may differ based on which device the user is currently using, and as such, the modification system may summarize or rank the same email messages multiple times. The modification system may also periodically re-rank email messages to ensure the current ranking is based on the most up-to-date information available.

BRIEF DESCRIPTION OF THE DRAWINGS

Aspects of the disclosure are described in detail below with reference to the attached drawing figures, wherein.

DETAILED DESCRIPTION

Figure 1:
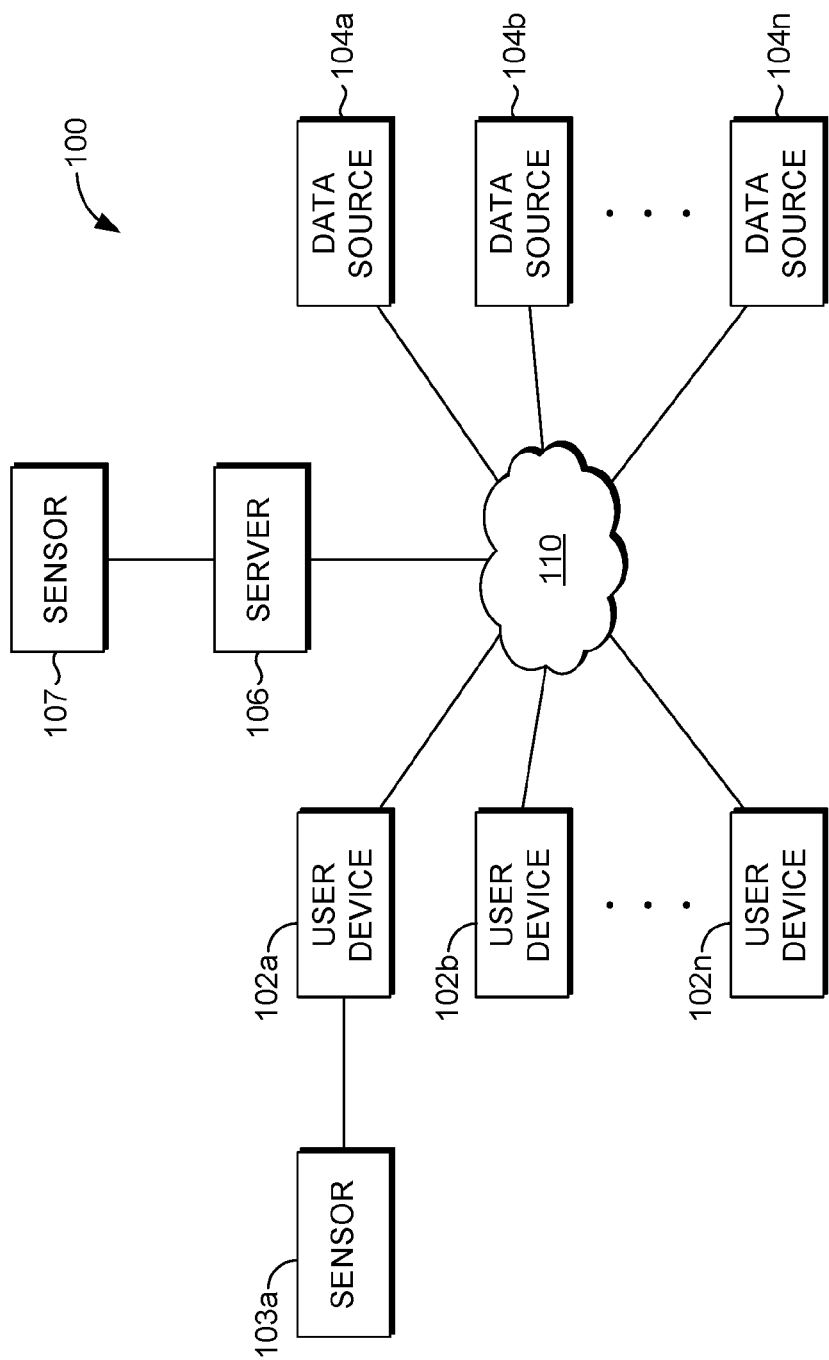
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to the use of contextual information associated with a user and user device characteristics to modify (e.g., rank or summarize) email messages for presentation to a user. The coalescence of telecommunications and computing technologies in the modern era has enabled, for the first time in human history, nearly constant communication including access to email, through a ubiquity of personal computing resources (including personal computing devices ("user devices") and cloud-computing coupled with communication networks). It is now common place for users to access email applications in mobile scenarios, on wearable or mobile devices, while driving, waiting for a meeting to start, etc. But conventional email applications and services have not evolved to provide efficient, appropriate utilization in these new scenarios or on these newer user devices. As a result, using conventional email technologies (which typically serve up and present each email (excluding junk mail), as it arrives without regards to the user context or device characteristics) creates numerous problems, as discussed previously including technological problems (e.g., a particular user device cannot present a certain kind of email attachment or does not have a display for rendering visual content) and user inconveniences (e.g., a user only has a five minutes to check her email before a scheduled meeting, therefore only shorter messages should be provided).

Although some efforts to address these technological challenges include email systems that attempt to rank email messages, the ranking is not effective, as it does not consider what the user is currently doing, a mode of movement, the time period the user currently has to read/view the email messages, what the user's current interests are, patterns of activity, and further do not consider features of the user computing device that the user is currently using, which may have a significant impact on which email messages are best to present to the user at a particular time. For example, the user's context may significantly affect not only the email message ranking directly and indirectly by way of categorization of email messages, but also which email messages can be automatically read to the user while the user is driving, and which would be best opened and read when the user can view a screen. As such, some aspects of the technologies described herein enable email messages to be ranked efficiently based on these factors. Even more, as new types of devices become available to users, such as wearable computing-devices, smart glasses, and devices that could be embedded in the human body in the future, determining what is most appropriate to present to a user at a given time becomes even more crucial for providing the user with an enhanced experience. As such, ranking (which may include filtering) incoming email messages or other similar types of messages (e.g., text messages, voicemails) in a way that makes the user's experience more productive is provided herein.

Accordingly, some embodiments of the present disclosure solve the problems introduced by conventional email technologies by modifying email content that would otherwise be presented to a user based on determined contextual information associated with a user and/or characteristics of the user device(s) for which the user accessed the email content. In this way, these embodiments override the conventional operation of email by not necessarily presenting every email message (excluding junk mail) that the user receives to the user, but selectively presenting email (including presentation via audio means, such as a computer reading emails to a user), including modifying the order of presentation, based on a modification that considers user context and/or characteristics of the user's computing devices. The modification of email content may comprise summarizing or ranking the order of emails presented to (or for presentation to) a user and/or filtering or withholding email content that is less appropriate for the user's particular context or user device. (In some embodiments, a summary may be provided to the user indicating that email content exists but is unsuitable less-than-optimal for presentation in the user's current context (or via the user's device).

Additionally, aspects herein, as mentioned, improve user efficiency and productivity on user devices available to the user. Specifically, the user's interaction with incoming email messages can be greatly enhanced when the email messages are summarized or ranked based on user context and/or user device characteristics. Embodiments of email modification technologies described herein consider the user's context and/or available user device context, including the interaction capabilities to read email messages. These factors may include, by way of example and without limitation, whether the user is on-the-go or not, device screen size (e.g., smartphone versus a larger screen), applications required to consume content, whether the user is alone or around other people, available bandwidth, data usage, whether applications are available to process attachments, etc. Some embodiments of the modification systems and methods also may consider the email messages themselves, such as the text length, embedded content (e.g., pictures, graphs, tables), attachments (e.g., number of attachments, size, and types), and whether the email message is suitable for use with an automatic reading application.

Cross device ranking or summarization may also be considered. For example, when multiple user devices are available to the user at the same time, some or all of these user devices may be aware of the other user devices and the capabilities of the other user devices, for example either by central or distributed logic. Email messages may thus be ranked or summarized differently for each of the user devices based on the understanding of the overall available devices. For instance, for a user sitting in her office, different email content may appear on her phone versus her laptop, because emails have been ranked on her phone based on the characteristics of her device.

As such, a first aspect of the present disclosure is directed to a computerized system. The computerized system includes a user device monitor configured to identify and monitor a user device and user device characteristics, a user data collection component configured to identify and monitor user activity, one or more processors, and one or more computer storage media storing computer-useable instructions that, when used by the one or more processors, cause the one or more processors to perform operations. These operations comprise analyzing one or more features of each of a plurality of email messages, received in an email application, corresponding to a user, and determining one or more of contextual information associated with the user or characteristics of the user device. In some embodiments, the email application runs in the cloud or on an email server, on a user device, or both, and in some embodiments, email content for a user may be accessed via one or more user devices. The operations further comprise modifying the plurality of email messages based on the one or more of the contextual information associated with the user or the characteristics of the user device, and communicating for presentation at least a portion of the plurality of email messages based on the modification.

A second aspect of the present disclosure is directed to a computerized method for enabling email message ranking based on user device characteristics. The computerized method comprises determining that a user is associated with two or more user devices and, from a data store, retrieving one or more characteristics for each of the two or more user devices. Further, the method comprises, for a first user device of the two or more user devices, ranking, based on the one or more characteristics of the first user device, a plurality of email messages that correspond to the user, and for a second user device of the two or more user devices, ranking, based on the one or more characteristics of the second user device, the plurality of email messages. The ranking of the plurality of email messages for the first user device results in a different ranking than the ranking of the plurality of email messages for the second user device.

A third aspect of the present disclosure is directed to a computerized method for enabling email message modification based on user context. The method comprises analyzing user context for a user having a plurality of email messages in an email application. The user context comprises one or more of the user's location, the user's activity, a schedule associated with the user, the user's routine, or other people located near the user. The method further comprises ranking the plurality of email messages that correspond to the user based on the analyzed user context, and modifying the content of at least one email message. The method further comprises communicating for presentation at least a portion of the plurality of email messages in accordance with the ranking.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 202 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. For example, in one instance sensor(s) 103a comprises a location sensor, such as a global positioning system (GPS) or similar location-determining component or function. This may assist the system, such as system 200, to understand, for example, whether the user is on the go at the current time, or is stationary.

Figure 2:
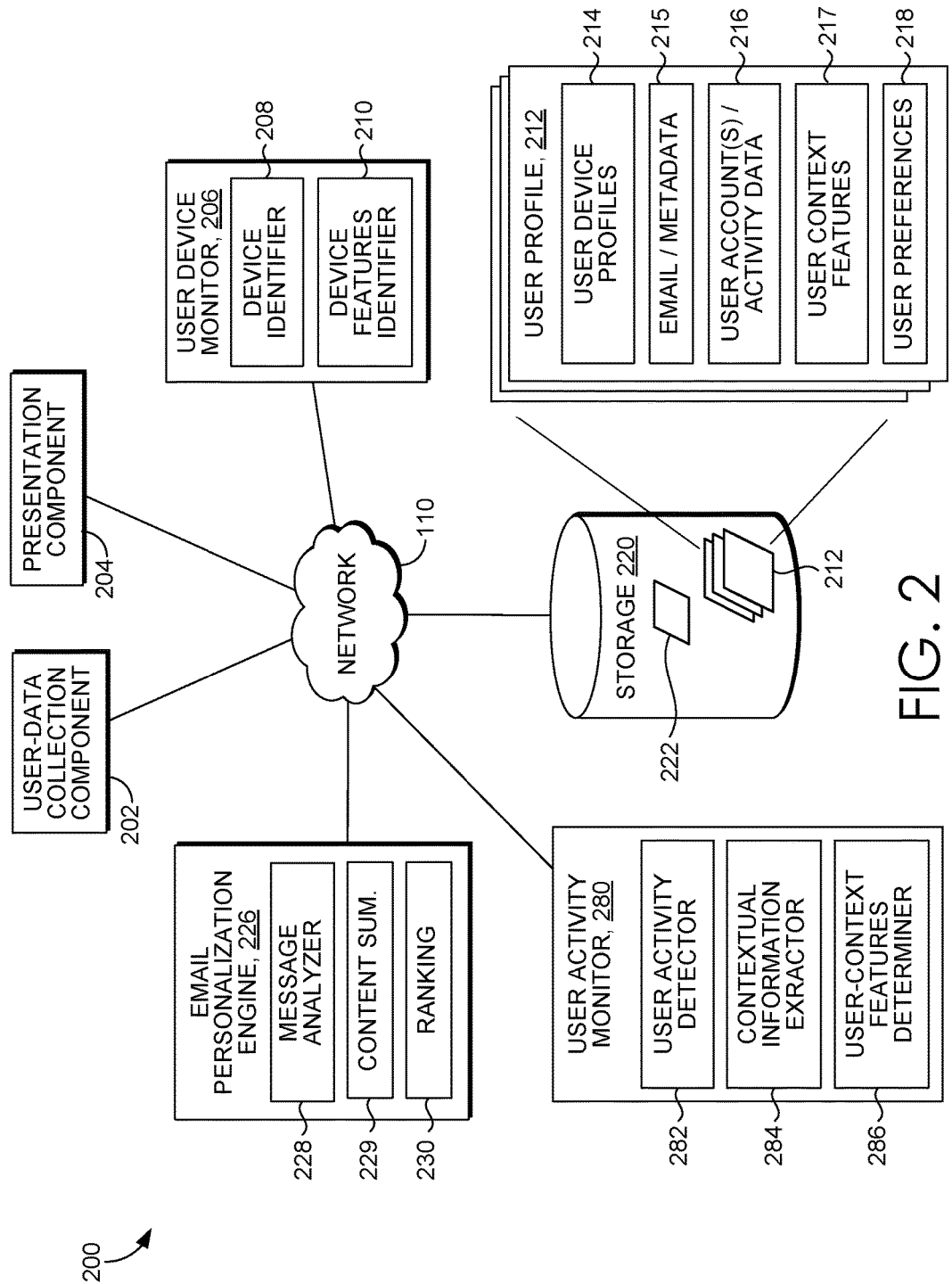
FIG. 2 is a diagram depicting an example computing architecture suitable for implementing aspects of the present disclosure.

Operating environment 100 can be utilized to implement one or more of the components of system 200, described in FIG. 2, including components for collecting user data, collecting device-specific data, and/or presenting email messages to a user based on a ranking. Referring now to FIG. 2, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Exemplary system 200 includes network 110, which is described in connection to FIG. 1, and which communicatively couples components of system 200 including user-data collection component 202, presentation component 204, user device monitor 206, email personalization engine 226, user activity monitor 280, and storage 220. User device monitor 206 (including its components 208 and 210), user-data collection component 202, presentation component 204, user activity monitor 280, and email personalization engine 226 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 202 is generally responsible for accessing or receiving (and in some cases also identifying) user data from one or more data sources, such as data sources 104a and 104b through 104n of FIG. 1. In some embodiments, user-data collection component 202 may be employed to facilitate the accumulation of user data of one or more users (including crowd-sourced data) for, among other things, user device monitor 206, email personalization engine 226, user activity monitor 280, and/or presentation component 204. The data may be received (or accessed), and optionally accumulated, reformatted, and/or combined, by user-data collection component 202 and stored in one or more data stores, such as storage 220, for further use by the email personalization engine 226 or other components of system 200. For example, the user data may be stored in or associated with a user profile 212, as described herein. In some embodiments, any personally identifying data (i.e., user data that specifically identifies particular users) is either not uploaded from the one or more data sources with user data, is not permanently stored, and/or is not made available to the other components of system 200.

User data may be received from a variety of sources where the data may be available in a variety of formats. For example, in some embodiments, user data received via user-data collection component 202 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as properties or characteristics of the user device(s), user activity information, which may be associated with the user device(s) (for example: app usage information; online activity; searches; usage duration; and other user-interaction data; voice data such as automatic speech recognition; activity logs; communications data including calls, texts, instant messages, and emails; website posts; other user data associated with communication events; user history; session logs) including, in some embodiments, user activity that occurs over more than one user device; network-related information (e.g., network name or ID, domain information, workgroup information, connection data, or other network-related information), application data, contacts data, calendar and schedule data, notification data, social network data, smartphone data (such as phone state, charging data, date/time, or other information derived from a smartphone), news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, GPS data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein.

User data also may include interpretive data, which may be determined or derived using other user data. Interpretive data corresponds to data utilized by the components of system 200 (or subcomponents) to interpret or derive additional information from user data. For example, interpretive data can be used to provide context to user data, which can support determinations or inferences made by the components or subcomponents. For instance, in some embodiments interpretive data comprises statistical ratios of feature values (sometimes referred to as "relative features"). By way of example, such user data may include, without limitation, user mode-of-movement data, such as whether the user is walking, running, swimming, driving, using public transportation, etc.; a time slot available for the user to read/view email messages, such as the time available for the user to complete the process of reading and responding to an email to avoid context switching back and forth when completing the process for a single email (e.g., can the user process the email within the available time slot); or subject matter of upcoming events on a calendar (e.g., emails that are associated with upcoming meetings may be ranked higher to enable proper preparation for the meetings). In some embodiments, interpretive data may be determined by one or more components (or subcomponents) of system 200. For instance, the above examples of interpretive data may be determined by activity monitor 260, in an embodiment. In some embodiments user data includes location information where it is available to be sensed or otherwise detected from a user device. However, as described previously, in some embodiments, user data does not include information enabling an accurate location determination of the user device so as to protect the user's privacy.

In some respects, user data may be provided in user-data streams or signals. A "user signal" can be a feed or stream of user data from a corresponding data source. For example, a user signal could be from a smartphone, a home-sensor device, a vehicle-sensor device, a wearable device, a user device, a gyroscope sensor, an accelerometer sensor, a calendar service, an email account, a credit card account, or other data sources. In some embodiments, user-data collection component 202 receives or accesses data continuously, periodically, or as needed.

User device monitor 206 is generally responsible for monitoring user data including data for user devices associated with a user, information related to the user devices, or other user data that may be used for facilitating identifying a particular user's user devices and extracting user device-activity information. As described previously, user device features may be determined by monitoring user data received from user-data collection component 202. In some embodiments, the user data and/or information about the user determined from the user data is stored in a user profile, such as user profile 212.

At a high level, embodiments of user device monitor 206 may determine, from the user data, one or more user devices associated with a particular user and user device related activity, (which may include contextual information associated with the identified user device(s)), which may be stored as part of a user profile 212, such as the user's device(s) 214 and user account(s)/activity data 216. In an embodiment, user device monitor 206 comprises one or more applications or services that analyze the user devices used by the user to determine information about the devices and device usage. In some embodiments, user device monitor 206 monitors user data associated with the user devices and other related information on a user device, across multiple computing devices or in the cloud. Information about the user's user devices may be determined from the user data made available via user-data collection component 202, and maybe provided to devices feature identifier 210, among other components of system 200.

As shown in example system 200, user device monitor 206 comprises a device identifier 208 and a device features identifier 210. In some embodiments, user device monitor 206, one or more of its subcomponents, or other components of system 200, such as device features identifier 210, may determine interpretive data from received user data. As described previously, interpretive data corresponds to data utilized by the components of system 200 (or subcomponents) to interpret user data. Moreover, it is contemplated that embodiments of user device monitor 206, its subcomponents, and other components of system 200 may use user data and/or user data in combination with interpretive data for carrying out the objectives of the subcomponents described herein.

Device identifier 208, in general, is responsible for identifying user devices associated with a particular user. In some embodiments, device identifier 208 identifies a set of one or more devices by monitoring user data for user-device related information. Information about the identified devices provided by device identifier 208 may be used for determining features associated with the device (such as by device features identifier 210) in conjunction with information determined from the user-data collection component 202, or for monitoring the identified devices, including user interactions with the identified devices, by user device monitor 206.

In some implementations, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of device identifier 208 determine a device name or identification (device ID) for each device associated with a user. This information about the identified user devices associated with a user may be stored in a user profile associated with the user, such as in user device profile 214 of user profile 212. In an embodiment, the user devices may be polled, interrogated, or otherwise analyzed to determine information about the devices. This information may be used for determining a label or identification of the device (e.g. a device ID) so that the user interactivity on one user device may be recognized and distinguished from user interactivity on another user device, so that it may be recognized from user data by user device monitor 206 or other components of system 200. In some embodiments, users may declare or register a device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

User device monitor 206 or subcomponents therein may search and/or analyze user data, which may be provided by user-data collection component 202, for any of a variety of user-device related data including user device variables. By matching user data to one or more user devices and/or device variables thereof, device monitor 206 may detect and monitor the devices and user interactions with those devices from the user data. In some embodiments, user device variables may be tracked (such as monitored and/or stored) by user device monitor 206 with respect to a corresponding detected instance of a device. In particular, values corresponding to tracked device variables may be stored in association with a user, for example, with respect to a corresponding one of user profiles 212, such as in user device profile 214. Tracked variables can correspond to any of a variety of user data related to the user device, examples of which have been described above and include sensor data or readings, which may be sensed by one or more sensors (such as information associated with a user device regarding device characteristics, network or communication related information, position/motion/orientation, user-access/touch, connecting/disconnecting a charger, user activity on the user device, or other information that may be sensed by one or more sensors, such as sensors found on a mobile device), or the like. It will be appreciated that values of tracked variables may be associated with one or more user devices and/or user activity and need not be device specific. An example of a tracked variable is a time stamp corresponding to a respective instance of a user interaction with a user device. The time stamp can indicate the relative order or sequence of an interaction with the device with respect to other interactions, and optionally instances of one or more other user device interactions of a corresponding routine or pattern, which may be identified as a device feature, as further described below.

As a further example, interaction with a user device may comprise data indicating a user has accessed a web browser on the user device. One tracked variable may correspond to a particular website, series of websites, or category of websites (e.g. entertainment, news, financial, children-related, shopping) accessed by the user. It will be appreciated that the level of granularity in the detection and tracking of potential user interactions with user devices can vary. Thus, as an example, a particular visited website need not be a tracked variable. Furthermore, other examples of potentially tracked variables, or more generally device-related variables are further described in connection to device features identifier 210. Additionally, although several examples of how user device monitor 206 or device identifier 208 may make such determinations are described herein, many variations of user device identification and user device monitoring are possible in various embodiments of the disclosure.

Continuing with system 200 of FIG. 2, device features identifier 210 is generally responsible for determining user device features of user devices. In some embodiments, device features identifier 210 receives information from user device monitor 206, such as user device characteristics or other information about a specific user device and/or user activity information, and analyzes the received information to determine a set of features associated with the user device. In some embodiments, user activity information may be received from user activity monitor 280. Alternatively or in addition, in some embodiments, device features identifier 210 accesses or otherwise receives user data, such as from user-data collection component 202, and analyzes the user data to identify a device and determine a set of device features for the device.

The term "user device features" as used herein may broadly refer to any information about or related to a user device, including information regarding the user and other user device(s) associated with the user, that may be used by the email personalization engine 226 or other components of system 200. Without limitation, examples of user device features include: device screen availability and size; reading capabilities of the device; exposure level of the user device to other people (e.g., screen versus private glasses; earphone versus speaker; whether emails are sensitive (e.g., private, medical) or not); input method(s) available on the user device (e.g., full keyboard versus partial smartphone keyboard, voice commands, noise filtering); applications available on the user device; time-related features, such as time(s) of day(s), day of week or month the device is used by the user, or length of usage; device characteristics, such as device type (e.g. desktop, tablet, mobile phone, fitness tracker, heart rate monitor, etc.); hardware properties or profiles; OS or firmware properties (which may include OS- or firmware-related information, OS level account(s), user-level accounts, and/or administrator-level accounts associated with the device, which may be present in an enterprise environment indicating the device is work-related); device IDs or model numbers; network-related information (e.g., mac address, network name, IP address, domain, work group, information about other devices detected on the local network, router information, proxy or VPN information, other network connection information, etc.); position/motion/orientation-related information about a user device, which may indicate information about the user such as in the case of a wearable device; power information such as battery level (which may indicate how long a particular device may be available for presenting email; for instance, if a device power is low, shorter email content may be ranked before longer email content); usage related features, such as app usage (which may also include application data), network usage information, online activity (e.g. searches, browsed websites, purchases, social networking activity, communications sent or received including social media posts, user device settings information, user account(s) accessed or otherwise used (such as device account(s) or online/cloud-services related account(s), such as Microsoft® account or Net Passport, online storage account(s), email or social networking accounts, etc.)); whether the device is shared or public or only used by a single user, number of users likely using the device; or complementary features, such as user calendar(s) information or contextual information, such as contextual information determined from user device monitor 206. User device features may also include information about user(s) using the device; other information identifying a user, such as a login password, biometric data, which may be provided by a fitness tracker or biometric scanner; and/or characteristics of the user(s) who use the device. In some instances, external features, such as features, characteristics, or other information from other devices, may be identified and associated with a particular user device. For example, user device features (such as described previously) for other user devices associated with the user may be considered as user device features (which may be referred to as external features) for a particular user device associated with the user.

In some embodiments, complementary features, which may include contextual information, may be utilized to determine information about the device user(s) or device, used to facilitate ranking of email messages. For example, user availability information (which may be determined using activity monitor 260, in an embodiment) may provide insights about whether a user is on-the-go or at home/work, such as where a user's calendar includes an entry like "meeting with client" or an entry like "time with kids." Such information may be determined using calendar information from one or more user calendars, such as office calendars, personal calendars, social media calendars, or even calendars from family members or friends of the user, in some instances. Some implementations construct a complementary or shadow calendar for the user, for use in determining complementary features. In addition, semantic analysis may be performed on information in the user data or device information determined from user device monitor 206, such as described in connection to user activity monitor 280 or contextual information extractor 284.

In some embodiments, device features may comprise user-behavior or pattern features, such as patterns of detected user interactions with user device(s). For example, a user may use a particular user device, such as a fitness tracker every Monday, Wednesday, and Saturday. Example approaches are described below, where each instance of a user device interaction has corresponding historical values of tracked variables that form patterns, and device feature identifier 210 may evaluate the distribution of the tracked variables for patterns. In the following example, a tracked variable for a user device interaction is a time stamp corresponding to an instance of the interaction. However, it will be appreciated that, conceptually, the following can be applied to different types of historical values.

In some embodiments, patterns of user interactions with the user device(s) (i.e., feature patterns) may be determined by monitoring one or more variables related to the user device(s) and/or user data associated with those devices, as described previously. These monitored variables may be determined from the user data described previously as tracked variables or as described in connection to user-data collection component 202. In some cases, the variables can represent context similarities among multiple user interactions with the device. In this way, patterns may be identified by detecting variables in common over multiple user interactions. More specifically, variables associated with a first user interaction with a device may be correlated with variables of a second user interaction with the device to determine a likely pattern. An identified feature pattern may become stronger (i.e., more likely or more predictable) the more often the user interaction instances that make up the pattern are repeated. Similarly, specific variables can become more strongly associated with a user interaction pattern as they are repeated.

Accordingly, device features identifier 210 determines a set of features associated with a user device, which may be used by the email personalization engine 226 to modify email or other types of messages or content for the user. In some embodiments, the user device features identified by component 210 may be stored in a user device profile, such as the user profile for user device(s) 214.

In embodiments, when multiple devices are available to or associated with a user at the same time, the different devices may be aware of each other and of the different device capabilities, either by central or distributed logic. The email messages may then be ranked differently for each of the device using the understanding of the capabilities of each device. If a particular user does have access to or is associated with multiple devices, such as could be determined by the device identifier 208, the system 200 may determine, such as by the device features identifier 210, features for each of those devices. These components may also determine which user device associated with the user or accessible to the user is currently active based on, for instance, user activity on a particular device.

In some embodiments, a goal of the system 200 is to provide continuity across multiple devices. For example, if a user receives an email message from her boss at work, the scope or exposure of the email message may be adjusted based on device capabilities (i.e., user device features). If the email message is lengthy and includes an attachment, for example, the best time to show it to the user may not be when the user is walking ten blocks from work to a restaurant, but would make sense to provide the full text and attachment when the user returns to work and can read the message on her work computer. But, in an embodiment, the system 200 may alert the user that she did receive an email message from her boss so she knows it is there. In this scenario, the email message may not be received as "read" if only a summary or indication of the email message is provided to the user.

As such, a set of email messages in a user's inbox may be ranked differently for potential presentation to (or withholding from) a user, based on which device is currently available to the user. This, in some cases, is not based on just the current device capabilities, but also known capabilities of other user devices accessible or used by the user. Here, it is useful to know that, for example, a particular user has access to a smartphone, a tablet, and a computer with a 29" monitor at home. It may not be as beneficial to the user to provide a lengthy email with attachments to the user on her smartphone as it would to provide that same email to the user on the tablet or the computer with the 29" monitor. Additionally, if the user's tablet does not have an application that allows a particular attachment to be opened/modified on the tablet, the system 200 may determine not to rank highly that email (or not show it at all, or just provide an indication that it exists and in some instances indicate a particular application that is needed) until the user is working on another device having the needed application.

Continuing with system 200 of FIG. 2, user activity monitor 280 is generally responsible for monitoring user data for information, which may be used for determining user activity, related contextual information, and aspects of the user context. The user context determined by user activity monitor 280 may be utilized by email personalization engine 226 along with information determined by user-device monitor 206 to modify email content for presentation to a user (such as by summarizing the content and/or ranking email messages for delivery to the user via a particular user device) based on based on contextual information associated with a user and/or characteristics of the user device(s) used to access the email content. In some embodiments, user activity information or user context determined from component 280 may be used by user-device monitor 206 or may be used in addition to other contextual information determined by user-device monitor 206.

User activity information may include identifying and/or tracking features (sometimes referred to herein as "variables") or other information regarding specific user actions and related contextual information. Accordingly, embodiments of user activity monitor 280 may determine, from the monitored user data, user activity associated with a particular user (or information related to the activity, such as contextual information) that represents aspect of the user context. In some embodiments, the user activity information and/or related contextual information determined by user activity monitor 280 may include user activity information determined from multiple user devices associated with the user and/or from cloud-based services associated with the user (such as email, calendars, social-media, or similar information sources), and which may include contextual information associated with the identified user activity. User activity monitor 280 may determine current or near-real-time user activity information and may also determine historical user activity information, in some embodiments, which may be determined based on gathering observations of user activity over time, accessing user logs of past activity (such as location history or browsing history, for example). Further, in some embodiments, user activity monitor 280 may determine user activity (which may include historical activity) from other similar users (i.e., crowdsourcing), as described previously.

In some embodiments, information determined by user activity monitor 280 may be provided to email personalization engine 226 including information regarding the user context. Some embodiments may also provide user activity information, such as current or historical user activity, to user device monitor 206. As described previously, user activity features may be determined by monitoring user data received from user-data collection component 202. In some embodiments, the user data and/or information about the user activity determined from the user data is stored in a user profile, such as in user account(s)/activity data 216 of user profile 212.

In an embodiment, user activity monitor 280 comprises one or more applications or services that analyze information detected via one or more user devices used by the user and/or cloud-based services associated with the user, to determine activity information and related contextual information. Information about user devices associated with a user may be determined from the user data made available via user-data collection component 202, and may be provided to user activity monitor 280, user device monitor 206, or other components of system 200.

As shown in example system 200, user activity monitor 280 comprises a user activity detector 282, contextual information extractor 284, and user-context features determiner 286. In some embodiments, user activity monitor 280, one or more of its subcomponents, or other components of system 200, may determine interpretive data from received user data, as described previously. Additionally, although several examples of how user activity monitor 280 and its subcomponents may identify user activity information are described herein, many variations of user activity identification and user activity monitoring are possible in various embodiments of the disclosure.

User activity detector 282, in general, is responsible for determining (or identifying) a user action particular user activity (referred to as an activity event) has occurred. Embodiments of activity detector 282 may be used for determining current user activity or one or more historical user actions. Some embodiments of activity detector 282 may monitor user data for activity-related features or variables corresponding to user activity such as indications of applications launched or accessed, files accessed, modified, copied, etc., websites navigated to, online content downloaded and rendered or played, or similar user activities, and may provide this information to user device monitor 206 or its subcomponents.

Additionally, some embodiments of user activity detector 282 extract, identify, or otherwise determine, from the user data, information about user activity, which may include current user activity, historical user activity, and/or related information such as contextual information. (Alternatively or in addition, in some embodiments, contextual information extractor 284 extracts or otherwise determines contextual information, based on an identification of the activity determined by user activity detector 282.) Examples of user activity information detected by user activity detector 282 may include, without limitation, location information, app usage, online activity, searches, calls, usage duration, application data (e.g., emails, messages, posts, user status, notifications, calendar information, etc.), or nearly any other data related to the user, user interactions with one or more user devices, user activity determined via one or more user devices, or user-related activity information determined from the cloud. Among other components of system 200, the user activity information determined by user activity detector 282 may be provided to other subcomponents of user activity monitor 280, user device monitor 206, or email personalization engine 226. Further, the user activity may be stored in a user profile associated with the user, such as in user account(s)/activity data component 216 of user profile 212. In some embodiments, user activity detector 282 or user activity monitor 280 (or its other subcomponents) or user device monitor 206 (or its subcomponents) performs conflation on the detected user activity information. For example, overlapping information may be merged and duplicated or redundant information eliminated.

In some embodiments, the user activity-related features may be interpreted to determine a user activity has occurred. For example, in some embodiments, user activity detector 282 employs user activity event logic, which may include rules, conditions, associations, classification models, or other criteria, to identify user activity. For instance, in one embodiment, user activity event logic may include comparing user activity criteria with the user data in order to determine that an activity event has occurred. The activity event logic can take many different forms depending on the mechanism used to identify an activity event. For example, the user activity event logic could be training data used to train a neural network that is used to evaluate user data to determine when an activity event has occurred. The activity event logic may comprise fuzzy logic, neural network, finite state machine, support vector machine, logistic regression, clustering, or machine-learning techniques, similar statistical classification processes, or combinations of these to identify activity events from user data. For example, activity event logic may specify types of user device interaction(s) information that are associated with an activity event, such as navigating to a website, composing an email, or launching an app. In some embodiments, a series or sequence of user device interactions or activity detected via a user device may be mapped to an activity event, such that the activity event may be detected upon determining that the user data indicates the series or sequence of user interactions has been carried out by the user.

In some embodiments, activity event logic may specify types of user-device related activity that is considered user activity, such as activity that happens while a user is logged into the user device, while user interfaces are receiving input (e.g., while a computer mouse, touchpad, screen, voice-recognition interface, or the like are active), or certain types of activity like launching applications, modifying files with applications, opening a browser and navigating to a website, etc. In this way, the activity event logic may be used to distinguish genuine user activity from automated activity of processes running on the user devices, such as automatic updates or malware scanning. Once a user activity is determined, these features or additional related features may be detected and associated with the detected activity for use in determining activity patterns.

In some embodiments, user activity detector 282 runs on or in association with each user device for a user. User activity detector 282 may include functionality that polls or analyzes aspects of the operating system to determine user activity related features (such as installed or running applications or file accesses and modifications, for example), network communications, and/or other user actions detectable via the user device including sequences of actions.

Contextual information extractor 284, in general, is responsible for determining contextual information related to the user activity (detected by user activity detector 282 or user activity monitor 280), such as context features or variables associated with user activity, related information, and user-related activity, and further responsible for associating the determined contextual information with the detected user activity. In some embodiments, contextual information extractor 284 may associate the determined contextual information with the related user activity and may also log the contextual information with the associated user activity. Alternatively, the association or logging may be carried out by another service. For example, some embodiments of contextual information extractor 284 provide the determined contextual information to user-context features determiner 286, which determines activity features of the user activity and/or related contextual information that may be used for characterizing aspects of the user context.

Some embodiments of contextual information extractor 284 determine contextual information related to a user action or activity event such as entities identified in a user activity or related to the activity (e.g., other users invited to a meeting that the user is attending), location and/or venue information for the user (which may be determined via a user device), or user activity associated with the location or venue. By way of example and not limitation, this may include context features such as location data; which may be represented as a location stamp associated with the activity; contextual information about the location, such as venue information (e.g., this is the user's office location, home location, school, restaurant, move theater, etc.), yellow pages identifier (YPID) information, time, day, and/or date, which may be represented as a time stamp associated with the activity; user device characteristics or user device identification information regarding the device on which the user carried out the activity; duration of the user activity, other user activity/activities preceding and/or following the user activity (such as sequences of websites visited, a sequence of online searches conducted, sequences of application and website usage, such as browsing to a bank and then accessing an Excel® spreadsheet file to record financial information, or the like), transactions (such as ticket or food purchases, which may be determined from user-financial records (e.g., credit card or bank accounts) accessible in the cloud or by NFC payment using a user device, for instance), other information about the activity such as entities associated with the activity (e.g., venues, people, objects, etc.), information detected by sensor(s) on user devices associated with the user that is concurrent or substantially concurrent to the user activity (e.g., motion information or physiological information detected on a fitness tracking user device, listening to music, which may be detected via a microphone sensor if the source of the music is not a user device), or any other information related to the user activity that is detectable that may be used for determining patterns of user activity.

Contextual information determined by component 284 also may include semantic information. In some embodiments, contextual information extractor 284 (or activity monitor 280) performs semantic information analysis to determine semantic information associated with the user activity-related information identified by user activity monitor 280, its other subcomponents, or other components of system 200. For example, while a user-activity feature may indicate a specific website visited by the user, semantic analysis may determine the category of website, related websites, themes or topics or other entities associated with the website or user activity. Similarly, while a user-activity feature may indicate that the user is in-motion, the semantic analysis may determine that the user is traveling to work and whether the user is driving or riding on a train (which impacts the user's ability or availability to receive email content). Further, in some embodiments, semantic analysis performed by contextual information extractor 284 may determine additional user activity-related features semantically related to the user activity, which may be used for identifying user activity patterns or user behaviors.

In particular, as described previously, a semantic analysis may be performed on the user activity information, which may include the contextual information, to characterize aspects of the user action or activity event. For example, in some embodiments, activity features associated with an activity event may be classified or categorized (such as by type, time frame or location, work-related, home-related, themes, related entities, other user(s) (such as an activity with another user or communication to or from another user) and/or relation of the other user to the user (e.g., family member, close friend, work acquaintance, boss, or the like), or other categories). Further, in some instances, related features may be identified for use in determining a similarity or relational proximity to other user activity events, which may indicate a pattern or behavior. In some embodiments, contextual information extractor 284 (or activity monitor 280) may utilize a semantic knowledge representation, such as a relational knowledge graph when performing semantic analysis.

Contextual information extractor 284 (or activity monitor 280) may also utilize semantic analysis logic, including rules, conditions, or associations to determine semantic information related to the user activity. For example, a user activity event comprising messaging someone who works with the user may be characterized as a work-related activity. Thus, where the user messages people she works with every Sunday night, but not necessarily the same people, a pattern may be determined that the user typically performs work-related activities on Sunday night. Accordingly, it may be appropriate to rank (and/or present) emails related to work before emails related to other things, because the user is in a "work" context and may prefer to see emails related to work more than emails related to other things. Even further, in some instances, it may be determined that the user just messaged (or called, or otherwise interacted with) a particular coworker, and thus messages from that coworker or messages semantically related to the content that may be determined from the message (or interaction) may be ranked above other emails. In yet another example, where it is determined that a user has a presentation with a coworker tomorrow (which may be determined by user data such as calendar information, information from social media or communications (e.g., emails, texts, instant messages, etc.), email from that coworker (or email having content related to the presentation) may be ranked higher than other emails. In this way, email content presented on the same user device may be modified or ranked differently at one moment in time than another moment in time, based on changes in the user's context.

A semantic analysis performed by contextual information extractor 284 (or activity monitor 280) also may be used to characterize, interpret, or derive additional knowledge from contextual information associated with user activity. For example, it may be determined that a location associated with a particular user activity corresponds to a hub or venue of interest to the user (such as the user's home, work, gym, or the like) based on frequency of user visits to the location. For instance, the user's home hub may be determined (using semantic analysis logic) to be the location where the user spends most of her time between 8 PM and 6 AM. Similarly, the semantic analysis may determine time of day that corresponds to working hours, lunch time, commute time, etc. Similarly, the semantic analysis may categorize the activity as being associated with work or home, based on other characteristics of the activity (e.g., a batch of online searches about chi-squared distribution that occurs during working hours at a location corresponding to the user's office may be determined to be work-related activity, whereas streaming a movie on Friday night at a location corresponding to the user's home may be determined to be home-related activity). In this way, the semantic analysis may provide other relevant features of the user activity events (including patterns of behavior) that characterize aspects of a user context.

The semantic analysis may be used with other contextual information (as well as information about user activity and/or user devices, in some instances) to determine user availability. For example, using contextual information extraction and semantic analysis, it may be determined that a user has a pattern of riding a train every day for 30 minutes to commute to work. This inference might be determined based on the user's home location (home hub), work location (work hub), motion and/or location information collected while the user is traveling from home to work (or vice versa), train schedules, purchases (e.g., train ticket or a coffee shop at a train station), or similar information. Thus it may be determined that a user has a specific time slot (based on the train-ride duration) to and from work for potentially being presented certain types of emails. More generally, in some embodiments, contextual information extractor 264 (or user activity monitor 280 or user device monitor 206) may determine a shadow calendar (or complementary calendar) for the user, as described previously. The shadow calendar may be used for determining user availability as well as indicating current, historic, or upcoming events.

In this way, many aspects of user context, such as user mode-of-movement information (e.g., whether the user is walking, running, swimming, driving, using public transportation, etc.); user availability (which may be represented as time-slots of available durations of time, as discussed previously, and may also include corresponding information about the user's capability for receiving email content); information characterizing a user's capability of receiving email content (which may be determined based on the device features of user devices currently available to the user and current user activity; for instance, a user that is driving a car may have access to a smart phone, but would not safely be able to visually receive email content on the smart phone while driving. But the same user might be able to receive some email content in audio format, which may be presented over a car computer (a user device) or using user's smartphone, which could be linked to the car's speakers); information about current or upcoming user activity or events, such as calendar events (which may be used by email personalization engine 226 to prioritize email related to these current or upcoming activity or events; for instance, email for an upcoming meeting may be ranked higher (and thus presented to a user sooner) than other email); or other interpretive data or aspects of user context described herein, may be determined and provided to email personalization engine 226, device features identifier 210, or other components of system 200.

In some implementations, contextual information extractor 284 may receive user data from user-data collection component 202, parse the data, in some instances, perform semantic analysis, in some instances, and identify, extract, or otherwise determine contextual information. Contextual information also may be determined in a similar manner from the user data of one or more other users. For example, in an embodiment, user data from one or more other users may be provided by user-data collection component 210 in lieu of or in addition to user activity information for the particular user, and used for determining a user context for the particular user.

User-context features determiner 286 is generally responsible for determining user-context features (or variables) associated with the user activity and/or contextual information determined by other subcomponents of user activity monitor 280 (or other components of system 200, such as user device monitor 206). User-context features may be utilized by email personalization engine 226 (and may be utilized in conjunction with user device features, as determined from user device monitor 206) to modifying email content for presentation to a user (such as by summarizing email content and/or ranking email messages for delivery to the user via a particular user device) based on based on contextual information associated with a user and/or characteristics of the user device(s) used to access the email content. User context features may be determined from information about a user activity and/or from related contextual information, which may be determined by the other components of user activity monitor 280. In some embodiments, user-context features determiner 286 receives user-activity or related information from user activity monitor 280 (or its subcomponents, and analyzes the received information to determine a set of one or more features or variables associated with the user context.

In an embodiment, user context features or variables may be stored as a related set of contextual information, representing aspects of a user context, and may be stored in a user profile 212, such as in user context features component 217. Examples of user-context features include, without limitation, location-related features, such as location of the user (which may be determined from a user device and which may indicate that a user is out of his or her normal routine); venue-related information associated with the location, or other location-related information; time-related features, such as time(s) of day(s), day of week or month, or the duration of user activity, or related duration information such as how long the user used an application associated with an activity; features characterizing content associated with user activity, such as whether the content appears to be for work or pleasure/entertainment, features characterizing online activity (e.g., searches, browsed websites, purchases, social networking activity, communications sent or received including social media posts); other features that may be detected concurrent with user activity or near the time or the user activity; user activity patterns or behavior information, which may be used to determine whether a user is out of routine (i.e., not behavior according to a pattern; for instance the user is in a different location than what is expected from a pattern, such as in a different city, at home instead of at work, or at work longer than normal), which is part of the user context and may affect email ranking; other features that may be detected or sensed and used for determining a pattern of the user activity and/or whether a user is behavior according to pattern or out of routine; information characterizing aspects of the user activity (e.g., whether the user is running, riding a bike, walking, standing still, etc.); variables or features characterizing other aspects of user context, such as user mode-of-movement, user availability, user capability of receiving email content, or information about current or upcoming user activity or events; or any other aspect of user activity and/or related contextual information determined by the subcomponents of user activity monitor 280 (or other components of system 200). In some embodiments, user activity event logic (described in connection to user activity detector 282) may be utilized to identify specific user context features from user activity information and/or related contextual information.

Continuing with system 200 of FIG. 2, email personalization engine 226 is generally responsible for modifying email content to be provided to a user via a user device. In various embodiments, the email messages or content may be modified by (a) summarizing the email content, which may include modifying the format of content (e.g., converting text to audio or generating a textual summary of non-textual content, such as an image, presentation, or video, which may be included in the body of the email message, as an attachment, or hyperlinked in the email message), and/or (b) providing a ranking of a set of email messages. The summarization or ranking may be based on one or more of the email message content, user context (such as determined by user activity monitor 280), or user device capabilities (such as determined by the user device monitor 206).

As shown in example system 200, email personalization engine 226 includes a message analyzer 228 subcomponent, content summarization 229 subcomponent, and ranking 230 subcomponent. Message analyzer 228 (or email personalization engine 226) may be used to analyze email messages for a variety of features, such as length, whether any attachments are included, other information characterizing any attachments, what application(s) are needed for the user to access/read/modify the attachments, who the email message is from, urgency or importance (e.g., whether the message is related to an upcoming meeting or a flight the user is about to take), whether the email message is suitable for use with an automatic reading application, or other features described herein. In an aspect, these features may be associated with the particular email message and may be stored as metadata for that particular message. In one embodiment, the determined metadata is stored in email/metadata component 215 in user profile 212. The email metadata determined by email personalization engine 226 may be stored with the corresponding email message or may be stored with information identifying the corresponding email message, for instance.

Content summarization 229 is generally responsible for summarizing email content. In particular, in some embodiments, an email message may be summarized based on the user context, user-device characteristics, and the content of the email message itself (which may include any attachments). In some embodiments, content summarization 229 uses one or more automatic summarization processes; for instance in one embodiment a text summarization tool is utilized such as the AutoSummarize tool included in some versions of Microsoft Office®.

In some respects, the automatic summarization process(es) identifies a representative subset of data (the summary) that contains information of the entire set of data, such as by finding the most informative sentences. Two common approaches to automatic summarization include extraction and abstraction. Summaries based on extraction are generally produced by concatenating the most informative sentences or key phrases. Abstractive summaries generally summarize the main information in the document, and may contain literal phrases or sentences, based on a semantic interpretation of the document. For example, where an email message indicates that the sender is sorry that they will not be able to attend an event with the recipient based on a particular excuse, an abstractive summary may include that the sender regrets being unable to attend the event. Automatic summarization also may be applied to non-textual content; for instance images or video maybe summarized based on image-feature extraction, such as object/facial recognition, OCR, metadata (including captioning). Textual and non-textual content also may be summarized based on semantic analysis, which may include utilizing a semantic knowledge base. In one embodiment an Internet-search like operation may be performed on an image to identify similar images and information related to the image. For example, suppose an attachment comprises a picture of a friend at the Eifel tower. The friend may be identified using facial recognition combined with information form the recipient-user's social media accounts. That the image includes the Eifel Tower may be determined based on an image analysis by comparing features of the image to other images on the Internet to identify similar images (i.e. an image search) and extracting information from those search results. For instance, other images may be titled "Eifel Tower" or include related text about the Eifel Tower. In this way, a textual summary may be generated of the image indicating, for example, that the email includes an attachment of the particular friend at the Eifel Tower.

As described above, in some embodiments, a summary generated by content summarization 229 may be dependent on the user context and/or user-device characteristics of available user devices. In particular, where user activity monitor 280 determines that a user has limited availability (such as a 5-minute slot of time) then email content may be summarized accordingly. For example, where there is only one message to provide to the user on a particular user device based, then it may be unnecessary to summarize the email content, or a summary may be generated based on an expected length of time for the user to receive and/or respond to the provided summary. Similarly, where there are ten messages and the user has available the same amount of time, the summaries for the ten messages may be shorter because the user still has only the same availability (e.g. 5 minutes).

In this way, different summaries are generated based on varying user context and user-device contexts. For instance, when the user has five minutes available vs. thirty minutes available, the level of detail included in the summary may change. In an embodiment, the level of detail to include (or the length and/or format of a summary) may be based on personalization logic 222 (further described below), which may include rules for performing the automatic summarization, such as a maximum number of words (or length) of the summary. As another example, the summary may vary based on whether the user is driving vs. not driving. For instance, a summary may be generated specifically for audio playback while the user is driving and may include generated descriptions of non-textual content such as images or video. In some embodiments, information from related email messages may be included in the generated summary. For instance, past messages from the same sender or a particular email thread, such as an email conversation between multiple people related to a common subject. Additionally, in some instances as described above, the summarization performed by content summarization 229 includes modifying the format of email content. For example, email content may be converted from text to audio or a textual summary of non-textual content (such as an image, presentation, or video, which may be included in the body of the email message, in an attachment, or hyperlinked in the email message) may be generated.

Ranking 230 is generally responsible for modifying the order that email messages or summaries are presented to a user. As described herein, email messages may be ranked based on the user context, user device context (i.e., the characteristics of available user devices), and/or the email message content. In some embodiments, as further described below, personalization logic 222 may be used to perform ranking of the email messages. By way of example, suppose a user receives a message about a meeting while the user is running (user context), if the meeting is next week, then a summary of the message may be provided to the user based on this user context and possible further based on a user-device context, such as a wearable user-device. Moreover, the message may be ranked lower because it may not be important for the user to receive this message as compared to other more urgent messages that a user may want to receive. But suppose instead that the user is running because the user is late to the meeting and the received message indicates that the meeting location has changed or the meeting has been cancelled. Then the user will want to know this, so the message may be ranked higher by ranking 230.

In some embodiments, where user context includes information indicating that the user is alone (in private) or public (located in proximity to other people, or it is expected that other people will soon be near the user), the email messages may be modified accordingly. For example, messages with sensitive content may be altered or ranked lower. Sensitive content may include, without limitation, personal-identifying information, financial information, other personal information, or content that the user may desire to protect from the snooping eyes of others, which may be determined according to user preferences. For instance, in an embodiment, the sensitive content may be blocked out thereby preventing it from being seen or recorded by another person. Similarly email with sensitive content may be ranked below other emails. In another embodiment, a notification may be provided to the user indicating that the following email message includes sensitive content thereby enabling the user to decide when it is safe to view the content, such as when other people are no longer around the user.

In this way, the metadata (or analysis of the email message) may be utilized in conjunction with (or in some instances compared against) information about the user context and device capabilities/features to determine a summarization and/or ranking. For example, as mentioned previously, a short email message without attachments is likely easy for a user to view on a smartphone, but a lengthy email message with multiple attachments may be more difficult for the user to view on the smartphone, and thus may be appropriately summarized for the smartphone and user context or may be ranked lower than it would be on the user's other devices, such as a tablet, laptop, or desktop computer. Thus, the particular summarization or ranking is associated with presentation (or delivery) on a particular user device, in some embodiments. Further, in some instances, summarization and/or ranking may not be performed for every message. For example, it may be determined that the user context and device characteristics are such that modifying the messages is not necessary or desirable.

In some embodiments, email is modified (e.g., ranked, summarized, or otherwise modified in terms of how or what is provided to a user) using personalization logic 222. Personalization logic 222 may include rules, conditions, associations, classification models, or other criteria, to analyze and rank, filtering, summarizing, or otherwise modifying email. Generally personalization logic 222 considers one or more of: (a) user context, (b) user device characteristics, (c) email-related information (e.g., content, length, urgency, sender, attachments, application needed to view attachments, or other examples described herein), and (d) user preferences in order to determine personalization of email messages for the user. For instance, in one embodiment, personalization logic 222 may include logic for identifying email content to provide to a user that is appropriate for delivery to the user on an available user device(s) and given the user context. In various embodiments, personalization logic 222 may take many different forms. For example, the personalization logic 222 might include training data used to train a neural network (or other classifier) that is used to for assigning a score or weight for ranking to a particular email message, with respect to one or more user devices. In some embodiments, personalization logic 222 includes rules and processes for performing automatic summarization on email content, such as processes for performing content extraction or abstraction. In some embodiments, personalization logic 222 may comprise fuzzy logic, finite state machine, support vector machine, logistic regression, clustering, neural network, or other machine-learning techniques or statistical classification process(es), or combinations of these. For example, in one embodiment, personalization logic 222 determines a score for each email, in a set of email messages, corresponding to whether the email is suitable for presentation (including any means of delivery) to a user via a particular available user device and given a current user context. In some embodiments, an email messages score is part of the metadata corresponding to that particular message. Thus, in some embodiments, a particular email may have corresponding metadata with multiple scores, each associated with presentation (or delivery) on a particular user device. For instance, the metadata might include scores for ranking the email for presentation (including any format of delivery) via the user's smartphone, the user's smartwatch, vehicle computer system, or desktop computer.

In some embodiments, the email may be modified, such as by ranking, based on the determined score of each message and/or based on the time in which an email was received. For instance, where two email messages are determined to have the same score, the email message received first may be ranked higher, in one embodiment. In some embodiments, a threshold may be used for determining whether to withhold emails from presentation on a particular available user device or given the current user context based on the scored email. Where emails are withheld, an indication may be provided, in an embodiment, notifying the user that other email exists but is not being presented at that time or on the particular user device. For instance the indication might comprise an icon or other visual indicator in user's email app, notifications window on a user device, or a summary email message. Similarly, where emails are withheld that are part of a conversation, an indication may be provided to the user and/or content from the withhold message that is suitable for presentation may be presented, such as in the form of a summary email.

In some embodiments, email personalization engine 226 may summarize or rank email messages continuously, periodically, or as needed. For example, messages may be modified one time in a given time frame, or may periodically re-rank or re-summarize the email messages, such as when a new email message is received, when a predetermined quantity of email messages is received in the user's email system, or when the user's context changes and a different format (e.g., audio) is needed for presentation of email content. The re-ranking could also take place periodically after a predetermined amount of time has passed, such as every five, ten, fifteen, etc., minutes have passed, for instance; and the re-summarization could take place if/when the user's context has changed, as described above, for instance.

Figure 7:
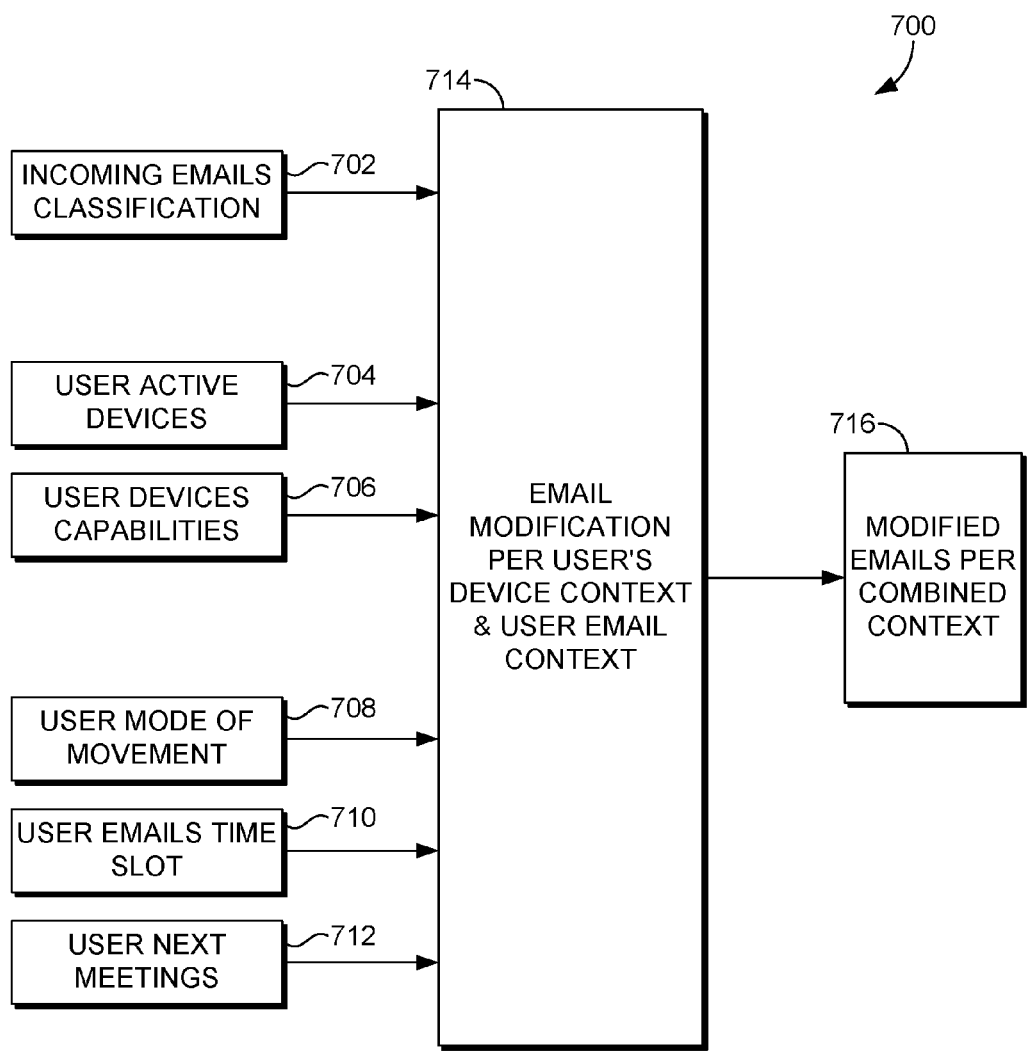
FIG. 7 is a block diagram of an exemplary system for personalizing email message content based on multiple inputs of user context and user device characteristics, in accordance with an embodiment of the present disclosure.

To illustrate an example of some inputs that might be used in modifying email messages, FIG. 7 shows a block diagram of an example system 700 for modifying email messages based on multiple inputs of user context and device characteristics, in accordance with an embodiment of the present disclosure. System 700 includes multiple inputs, including incoming emails classification 702 (e.g., analyzing features of email messages), user active devices 704, user device capabilities 706, user mode of movement 708 (e.g., is the user on-the-go or sitting/standing still), user emails time slot 710 (e.g., time available for user to read emails until next scheduled meeting on the user's calendar), and user's next meetings 712 (e.g., subject matter of next meeting). Each of these is described herein. Once the inputs are available to the example email modification system, modification occurs based on a combined context including inputs of emails classification, user context, and user device context, shown as item 714. The modified email messages 716 are then the output of the example system 700.

Example system 200 also includes a presentation component 204 that is generally responsible for presenting the personalized email messages to the user, based on the modification performed by email personalization engine 226. Presentation component 204 may comprise one or more applications or services on a user device, across multiple user devices, or in the cloud. For example, in one embodiment, presentation component 204 manages the presentation of ranked or summarized email messages to a user across multiple user devices associated with that user. For instance, based on personalization logic 222 and/or metadata determined by message analyzer 228 or email personalization engine 226, user device features, user context, and/or other user data, presentation component 204 determines on which user device(s) the ranked or summarized email messages are presented, because, as mentioned, email messages may be ranked or summarized differently depending on the device on which they are being viewed by a user. Further, as described previously, in some embodiments, a personal digital assistant service or application operating in conjunction with presentation component 204 determines when and how (e.g., presenting when the user is determined to be at a specific location) to present the ranked or summarized email messages.

Example system 200 also includes storage 220. Storage 220 generally stores information including data, computer instructions (e.g., software program instructions, routines, or services), logic, user profiles, and/or models used in embodiments described herein. In an embodiment, storage 220 comprises a data store (or computer data memory). Further, although depicted as a single data store component, storage 220 may be embodied as one or more data stores or may be in the cloud.

As shown in example system 200, storage 220 includes personalization logic 222, as described previously, and one or more user profiles 212. One example embodiment of a user profile 212 is illustratively provided in FIG. 2. Example user profile 212 includes information associated with a particular user including, among other things, information about user devices associated with the user and user context. As shown, user profile 212 includes, data about a user's device(s) (user device profiles) 214, email/metadata 215, data about the user account(s) and activity data 216, user context features 217, and user preferences 218. The information stored in user profile 212 may be available to email personalization engine 226 or other components of example system 200.

Embodiments of user device profiles 214 may include information about user device(s), such as information determined from user device monitor 206 (or device identifier 208 and device features identifier 210). In one embodiment, a user device profile 214 for a given device includes device features identified by device features identifier 210 for that device and may include information about other user devices that are associated with or accessed by the user. This information may be used for ranking or summarizing by the email personalization engine 226 for presentation to a user via the particular user device, as described previously.

Embodiments of email/metadata 215 is described previously in connection with email personalization engine 226. User account(s) and activity data 216 generally includes user data collected from user-data collection component 202. In some embodiments, the information in user account(s) and activity data 216 is determined from user-data collection component 202 or device monitor 206. In particular, user account(s) and activity data 216 may include data associated with user accounts, online accounts (e.g. email, social media), such as a Microsoft® Net passport, user email messages, texts, instant messages, calls, and other communications; social network accounts and data, such as news feeds; online activity; and calendars, appointments, application data, or the like. Some embodiments of user account(s) and activity data 216 may store information across one or more databases, knowledge graphs, or data structures. In some aspects, user account(s) and activity data 216 may perform one or more operations on the data it receives, such as semantically analyzing the data, reformatting the data, combining received data with other data that corresponds to the same user account/activity, and the like.

Embodiments of user context features 217 may include information about user context determined from user activity monitor 280 (or its subcomponents, or other components of system 200), as described previously. User preferences 218 generally include user settings regarding user preferences associated with the user's device(s), applications on the user's device(s), etc.; for example, not to bother a user with work notifications when at home. In some embodiments user preferences may be used for scoring messages for ranking or for filtering or withholding messages on particular user devices. For instance, a user may specify to not receive any work-related emails on her wearable fitness tracker. Or as another example, a user may specify a setting to not allow messages having any attachments (or any attachment exceeding a specified file size) to be presented on her smartphone even when her smartphone has an appropriate application for viewing the attachment. The user might desire this out of convenience or possibly to reduce her data usage on her phone. Some settings or other user preferences 218 may be explicitly provided by a user or inferred from user data or device features, as described previously.

Figure 3:
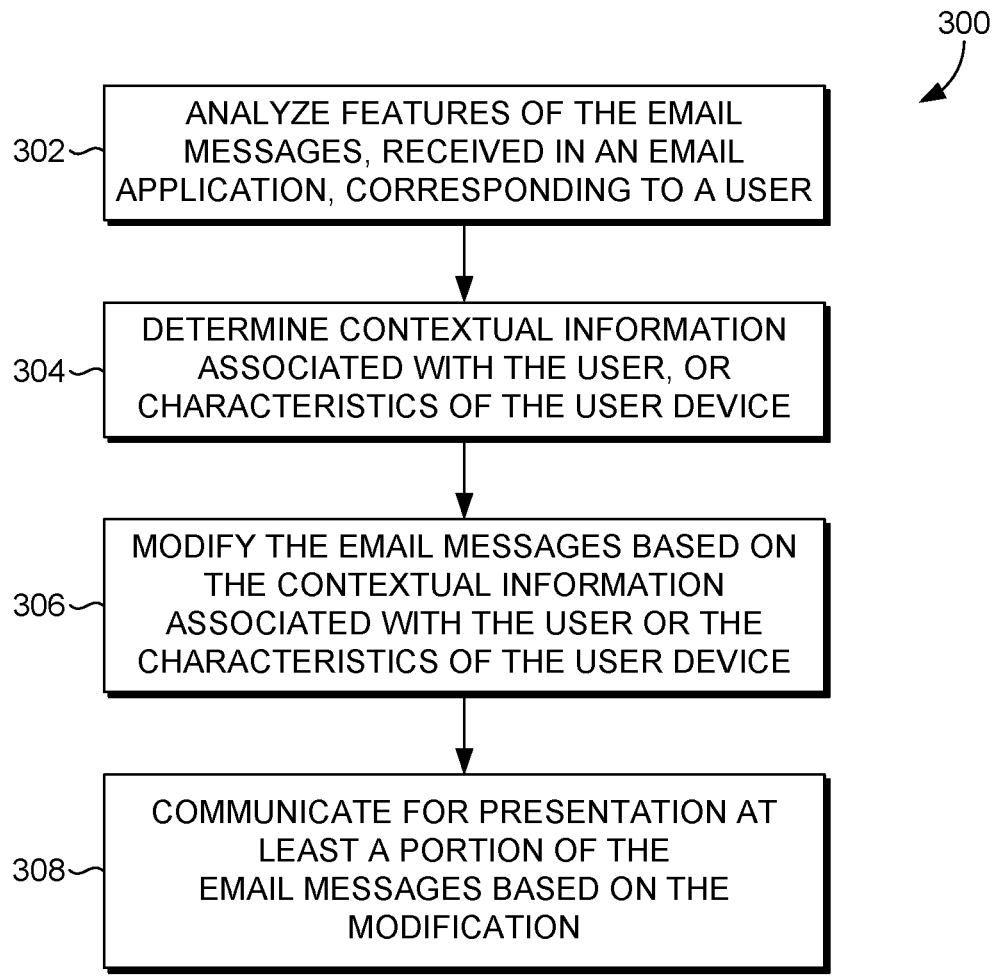
FIG. 3 depicts a flow diagram of a method for modifying email message content using contextual information associated with a user and characteristics of the user's mobile device, in accordance with an embodiment of the present disclosure.

Turning now to FIG. 3, a flow diagram is depicted of a method 300 for ranking email messages using contextual information associated with a user and characteristics of the user's mobile device, in accordance with an embodiment of the present disclosure. Initially at block 302, features of email messages are analyzed, where the email messages are received and stored in an email account, and where the email messages correspond to a user. These features may include, for example, length, subject, author, attachments, content, whether the email message is suitable for use with an automatic reading application, etc. including other aspects described herein. In some embodiments, the email features comprise metadata associated with the email, as described previously. These features (including the email metadata) may be considered in combination with other factors when the email messages are ranked, as discussed below. Some implementations of block 302 may be carried out using message analyzer 228 (or more generally, email personalization engine 226), as described in system 200 of FIG. 2. Additional details of embodiments of block 302 are provided in connection with email personalization engine 226 in FIG. 2.

At block 304, one or both of contextual information associated with the user or user device characteristics are determined. Contextual information comprises user context, such as determined by user activity monitor 280, and may also include other user data (e.g., data determined by the user-data collection component 202 of FIG. 2) associated with a user. For example, contextual information may include present, past, or future user activities of the user, the user's location, schedule (such as by way of calendar entries), routine, an amount of time before the user has an event on his/her calendar, whether other people are physically located near the user at the time the user data is collected, when the messages are ranked, or when presented to the user, or other user context features or aspects of user context described herein. As previously mentioned, if the user, for example, is determined to be on-the-go and using a smartphone, the system may not present a lengthy email message with attachments to the user at that time, but may instead provide a summary of the email, such as a subject and sender information. This type of summary may allow the user to understand the gist of the email message, and may further allow the user to request specific information from structured content, such as from a specific cell from a table or graph. In one embodiment, a user device characteristic may include determining how many user devices are associated with the user, and determining the one (or more than one) that is currently active, where the user device is currently active if the user is currently using that device. This could include, for example, a determination that the user is actively checking email messages, using an application on the device, etc. User device characteristics could also include features such as available bandwidth, current/previous/available data usage, type of user device, screen size, applications available on the user device, and input methods (e.g., voice, keyboard, touch). For instance, a small screen size of a mobile device may not be best for displaying a large spreadsheet attachment, but may be more appropriate for a short email message without attachments. Characteristics or features of multiple user devices associated with a user may also be compared, as email messages may be ranked differently for different devices. For instance, if the user is associated with a first user device that is a smartphone and a second user device that is a desktop computing device, emails with attachments may rank higher on the second user device than the first user device. Some implementations of block 304 may be carried out using user device monitor 206 (or its subcomponents) and/or user activity monitor 280 (or its subcomponents) as described in system 200 of FIG. 2. Additional details of embodiments of block 304 are provided in connection with user device monitor 206 and user activity monitor 280 in FIG. 2.

At block 306, the email messages are modified based on the contextual information and/or the characteristics of the user device. For example, email content may be summarized and/or email messages may be ranked, as described herein. In some embodiments, messages may be modified based on user preferences as well. At least a portion of the email messages are communicated for presentation based on the modification, shown at block 308. For instance, the portion of the email messages (which may include summarized messages in place of the original non-summarized messages) may be communicated from a server to a particular user device, or may be communicated from within a user device to a presentation component 204 associated with the user device, such as a particular user interface.

In an embodiment, it is contemplated that a particular user device may include the unmodified email messages and the modification is carried out on the user device. Further, in some cases, the modification may be change or be updated from moment to moment. For instance, a smartphone may modify the format of a message for audio playback while a user is driving; but then once the user stops and gets out of the vehicle, the same message may be provided as a textual summary or provided without modification in its original format. Similarly, the message may be ranked differently with respect to other email messages for presentation to the user via the smartphone once the user is no longer driving.

Some embodiments of block 306 are performed by email personalization engine 226 as described in system 200 of FIG. 2. Additional details of embodiments of blocks 306 and 308 are provided in connection with email personalization engine 226 and presentation component 204 in FIG. 2, respectively.

Figure 4:
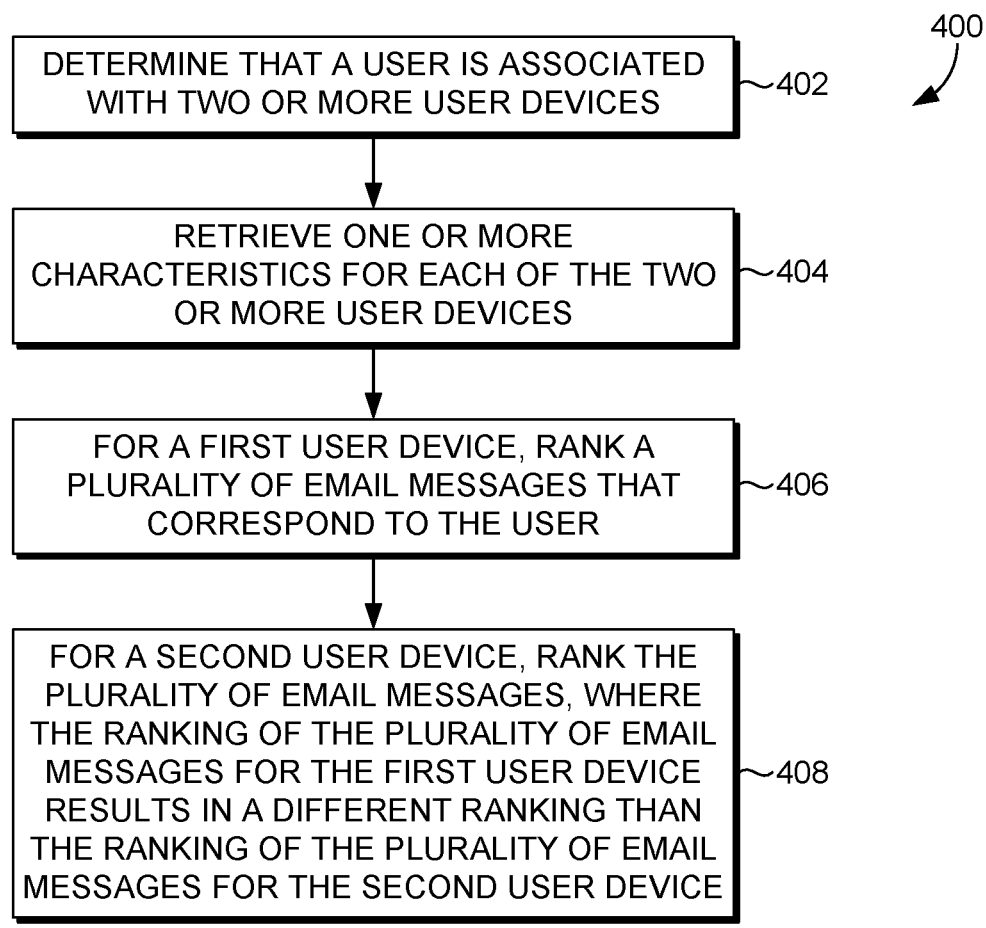
FIG. 4 depicts a flow diagram of a method for ranking email messages based on characteristics of a user's user devices, in accordance with an embodiment of the present disclosure.

FIG. 4 depicts a flow diagram of a method 400 for ranking email messages based on characteristics of a user's devices, in accordance with an embodiment of the present disclosure. At block 402, it is determined that a user is associated with two or more user devices. Characteristics for each of these user devices is received from, for example, a data store, such as storage 220, and more specifically, from user device profiles 214 of FIG. 2. In some aspects, a comparison is performed of the characteristics of the two or more user devices so that the system understands the different features of each. For a first user device, email messages corresponding to the user are ranked, shown at block 406. For a second user device, the email messages corresponding to the user are ranked, shown at block 408. In an embodiment, the ranking is different for the email messages on the first user device and the second user device based on the user device characteristics evaluated. The rankings for both devices may take into account the comparison of features of both devices. The characteristics of the first and second user devices may comprise, for example, an input method, available applications, screen size, an output method, type of device, etc.

In an embodiment, it may be determined that the user is currently interacting with the first user device. As a result, a portion of the email messages may be communicated for presentation on the first user device in accordance with the ranking based, at least, on the characteristics of the first user device. At a subsequent time, it may be determined that the user is currently interacting with the second user device. As a result, a portion of the email messages may be communicated for presentation on the second user device in accordance with the ranking based, at least, on the characteristics of the second user device. Additionally, when a user switches between different devices, it may be beneficial to the user if context switching is avoided. For example, the subject matter of the email messages read by the user on the first user device may be considered when the email messages are ranked for presentation on the second user device. By way of an example, if the user is a teacher, the system may consider keeping email messages from students together rather than separating them, more so if the user was reading email messages from students on the first user device before switching to the second user device. The intent is to allow the user to keep in his/her current state of mind without the need to switch contexts just because the user has switched to a different device.

Figure 5:
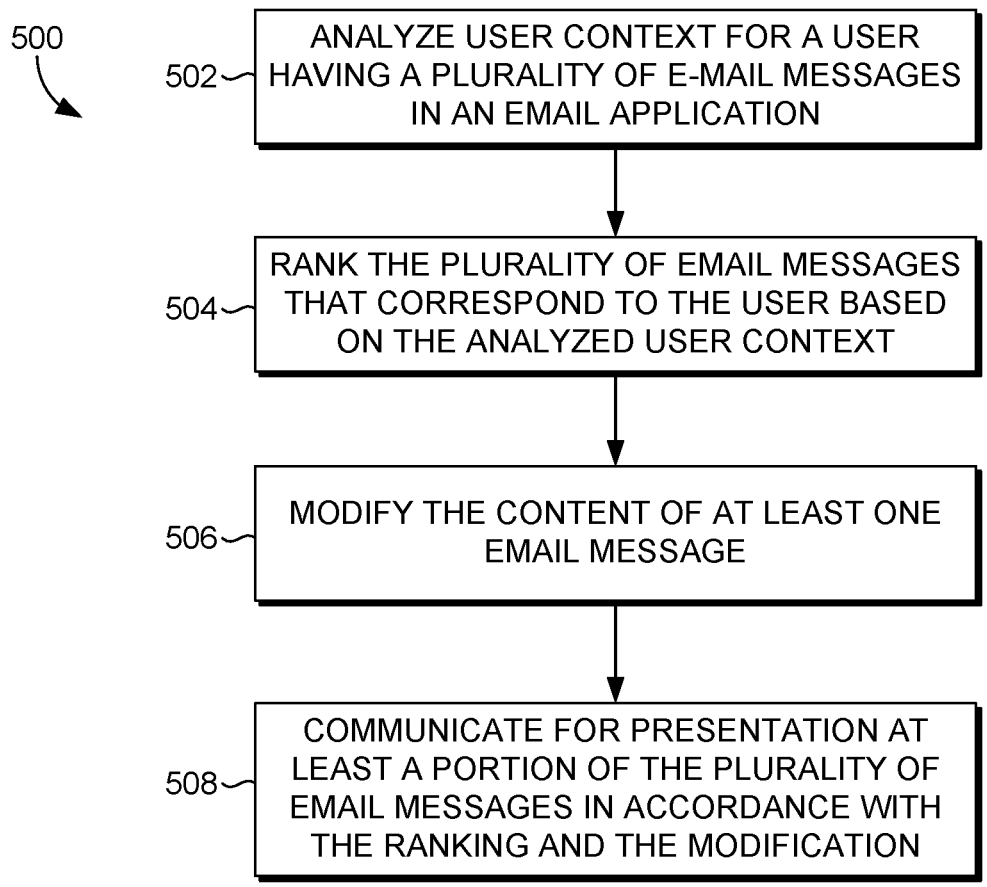
FIG. 5 depicts a flow diagram of a method for modifying email message content based on user context, in accordance with an embodiment of the present disclosure.

Referring to FIG. 5, a flow diagram is illustrated of a method 500 for ranking email messages based on user context, in accordance with an embodiment of the present disclosure. At block 502, user context for a particular user is analyzed, where the user is associated with email messages in an email application. The email application may reside in the cloud, on a user device, or both, or may be accessed via a user device. The user context may be determined by user activity monitor 280, as described previously. The user context could be, for instance, the user's location, activity, schedule, routine, other people located near the user, etc. This could be based on past, present, or anticipated future activities/locations of the user. The user context could also be a pattern of user activity or behavior based on past and current activities/behaviors, as described herein. Similarly, the user context may include information indicating whether the user is in or out of routine. Some embodiments of block 502 are performed by user activity monitor 280 as described in system 200 of FIG. 2. Additional details of embodiments of block 502 are provided in connection with user activity monitor 280 in FIG. 2.

At block 504, the email messages are ranked based on the determined user context and characteristics of the email messages (including email content). In particular, characteristics of the email messages maybe determined as described in connection with message analyzer 228 in FIG. 2. Some implementations of block 504 may be carried out using email personalization engine 226 (or its subcomponent) as described in system 200 of FIG. 2. Additional details of embodiments of step 504 are provided in connection with user email personalization engine 226 in FIG. 2.

At block 506, the email messages are communicated for presentation according to the ranking. Some embodiments of method 500 further include determining user device characteristics (or features) and ranking email messages based on the determined user device characteristics as well as user context. For example, as further described herein user device characteristics may be determined using user device monitor 206 in system 200 (FIG. 2).

Accordingly, we have described various aspects of technology directed to systems and methods for ranking email messages based on one or more of user device characteristics and contextual information associated with a user (e.g., user data), which may be used for providing a user with an enhanced and more efficient way of viewing his/her email messages. It is understood that various features, sub-combinations, and modifications of the embodiments described herein are of utility and may be employed in other embodiments without reference to other features or sub-combinations. Moreover, the order and sequences of steps shown in the example methods 300, 400, and 500 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 6:
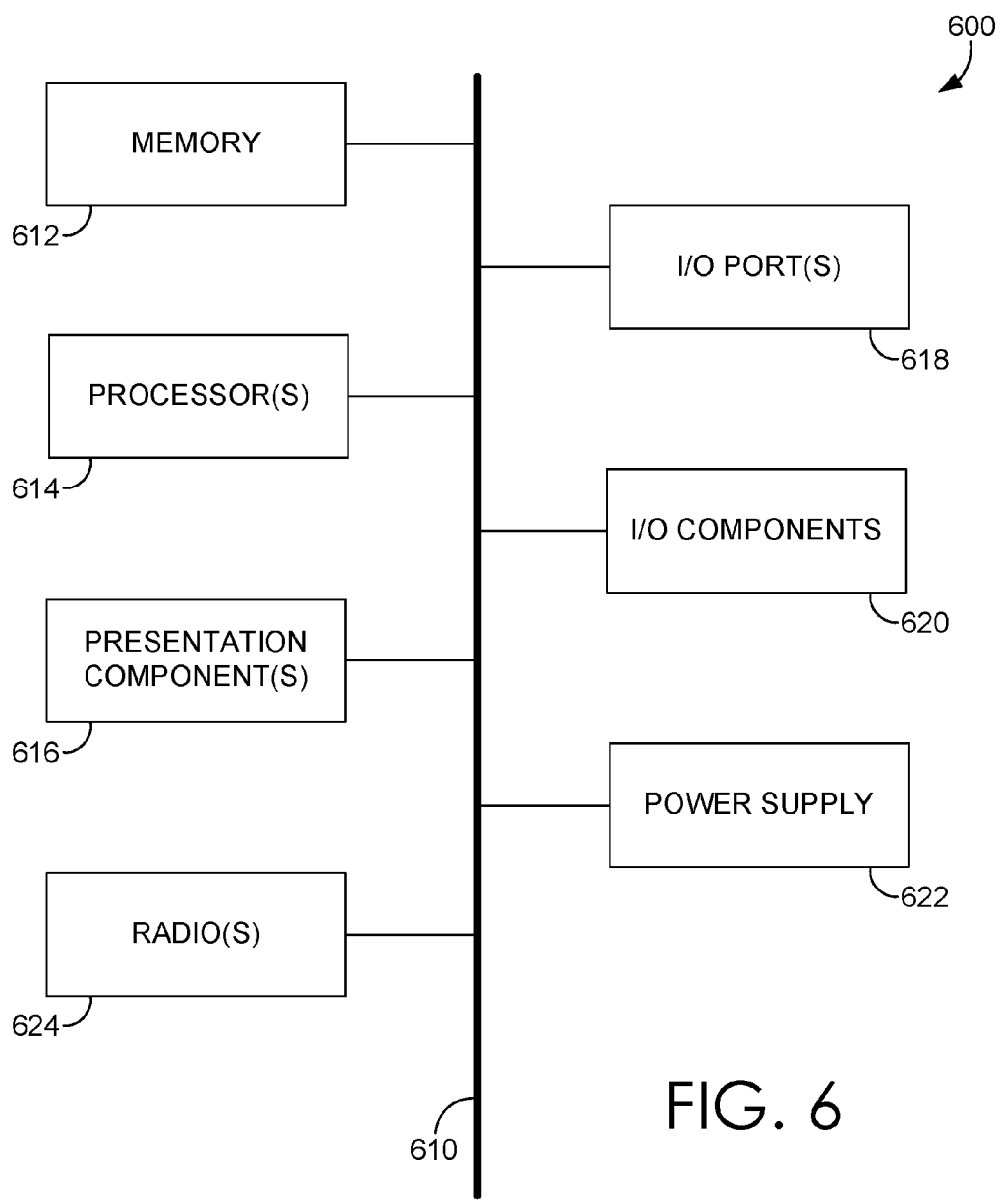
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc.

Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
    one or more sensors configured to provide sensor data;
    a user device monitor configured to identify and monitor a plurality of user devices, wherein the plurality of user devices comprises an active user device and at least one passive user device, wherein each of the plurality of user devices is associated with user device characteristics based in part on the sensor data, the characteristics of the plurality of user devices comprising one or more of data usage, bandwidth, a type of user device, a screen size, applications available on the user device, or input methods available on the plurality of user devices;
    a user-data collection component configured to identify and monitor user activity based in part on the sensor data;
    one or more processors; and
    one or more computer storage media storing computer-useable instructions that, when used by the one or more processors, cause the one or more processors to perform operations comprising:
    analyzing one or more features of each of a plurality of email messages, received in an email application, corresponding to a user;
    determining:
    (1) the active user device;
    (2) contextual information associated with the user based in part on the user activity, the contextual information comprising one or more of a location of the user, an activity of the user, a schedule associated with the user, the user's routine, or a predicted future activity of the user; and
    (3) characteristics of the active user device;
    modifying textual content of one or more of the plurality of email messages by summarizing the textual content based on the contextual information associated with the user;
    modifying the textual content of the one or more of the plurality of email messages by summarizing the textual content based on the characteristics of the active user device;
    ranking the one or more of the plurality of email messages based on the contextual information; and
    based on the modification of the textual content, communicating for presentation at least a portion of the plurality of email messages to the active user device based at least in part on the ranking.

2. The computerized system of claim 1, wherein modifying the plurality of email messages comprises at least one of generating a content summary for at least one email message of the plurality of email messages or reordering the plurality of email messages for the presentation to the active user device.

3. The computerized system of claim 1, wherein modifying the plurality of email messages comprises modifying the format of at least one email message of the plurality of email messages by (a) generating a textual summary of non-textual content of the at least one email message or (b) converting textual content of the at least one email message into an audio format.

4. The computerized system of claim 1, wherein the contextual information associated with the user comprises information indicating whether other people are physically located near the user at the time that the plurality of email messages are modified or a likelihood that the other people will be physically located near the user at a future time during which the presentation of at least the portion of the plurality of email messages is occurring.

5. The computerized system of claim 1, wherein the contextual information associated with the user comprises a period of time available before a future event on a calendar corresponding to the user.

6. The computerized system of claim 1, wherein the contextual information associated with the user comprises an indication of user availability during a future time interval.

7. The computerized system of claim 1, wherein determining the active user device comprises comparing the characteristics of each of the plurality of user devices.

8. The computerized system of claim 1, further comprising:
   prior to modifying the textual content of the one or more of the plurality of email messages, determining that the user is unable to read at least one email message at a current time;
   providing an alert to the user on the active user device of the at least one email message; and
   providing the modified textual content on the active user device at a point in time subsequent to the current time.

9. A method comprising:
   monitoring a plurality of user devices, wherein the plurality of user devices comprises an active user device and at least one passive user device;
   identifying the active user device, wherein the active user device is associated with user device characteristics based in part on sensor data from one or more sensors;
   analyzing one or more features of each of a plurality of email messages, received in an email application, corresponding to a user;
   determining:
   (1) the active user device;
   (2) contextual information associated with the user based in part on the user activity, the contextual information comprising one or more of a location of the user, an activity of the user, a schedule associated with the user, the user's routine, or a predicted future activity of the user; and
   (3) characteristics of the active user device, the characteristics of the plurality of user devices comprising one or more of data usage, bandwidth, a type of user device, a screen size, applications available on the user device, or input methods available on the plurality of user devices;
   modifying textual content of one or more of the plurality of email messages by summarizing the textual content based on the contextual information associated with the user;
   modifying the textual content of the one or more of the plurality of email messages by summarizing the textual content based on the characteristics of the active user device;
   ranking the one or more of the plurality of email messages based on the contextual information; and
   based on the modification of the textual content, communicating for presentation at least a portion of the plurality of email messages to the active user device based at least in part on the ranking.

10. The method of claim 9, wherein the modifying of the textual content of the one or more of the plurality of email messages comprises summarizing the textual content of the at least one email message, based in part on the textual content of the plurality of email messages and the determined type of the active user device.

11. Non-transitory computer-readable media having instructions stored thereon, wherein the instructions, when executed by a processor of a computing device, cause the computing device to perform actions comprising:
   monitoring a plurality of user devices, wherein the plurality of user devices comprises an active user device and at least one passive user device;
   identifying the active user device, wherein the active user device is associated with user device characteristics based in part on sensor data from one or more sensors;
   analyzing one or more features of each of a plurality of email messages, received in an email application, corresponding to a user;
   determining:
   (1) the active user device;
   (2) contextual information associated with the user based in part on the user activity, the contextual information comprising one or more of a location of the user, an activity of the user, a schedule associated with the user, the user's routine, or a predicted future activity of the user; and
   (3) characteristics of the active user device, the characteristics of the plurality of user devices comprising one or more of data usage, bandwidth, a type of user device, a screen size, applications available on the user device, or input methods available on the plurality of user devices;
   modifying textual content of one or more of the plurality of email messages by summarizing the textual content based on the contextual information associated with the user;
   modifying the textual content of the one or more of the plurality of email messages by summarizing the textual content based on the characteristics of the active user device;
   ranking the one or more of the plurality of email messages based on the contextual information; and
   based on the modification of the textual content, communicating for presentation at least a portion of the plurality of email messages to the active user device based at least in part on the ranking.

* * * * *